UNITED STATES PATENT OFFICE.

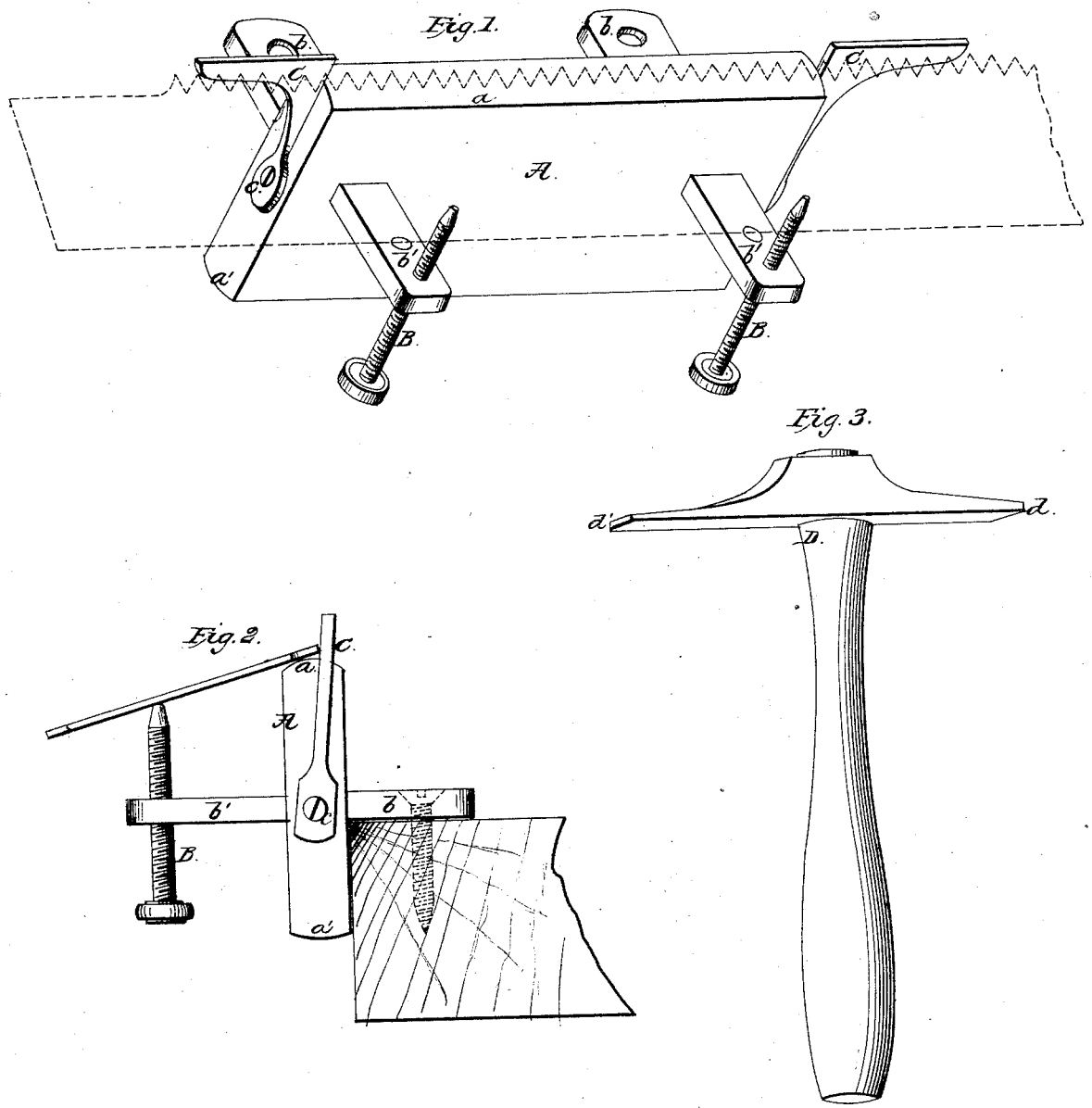

JOHN HANFORD, JR., OF DETROIT, MICHIGAN.

IMPROVEMENT IN SAW-SETS.

Specification forming part of Letters Patent No. 45,037, dated November 15, 1864.

*To all whom it may concern:*

Be it known that I, JOHN HANFORD, Jr., of Detroit, in the county of Wayne and State of Michigan, have invented a new and Improved Saw-Set; and I do hereby declare that the following is a full, clear, and exact description thereof, which will enable others skilled in the art to make and use the same, reference being had to the accompanying drawings, making a part of this specification, in which—

Figure 1 is a perspective view of my invention; Fig. 2, a transverse vertical section of the same; Fig. 3, a detached view of the hammer used with the same.

Similar letters of reference indicate like parts.

This invention consists in the employment or use of a bed-piece in connection with set-screws and gages, all arranged in such a manner that, with the aid of a hammer, saws may be set accurately and expeditiously, and both large and small saws operated upon with one and the same implement.

A represents a bed-piece, which may be constructed of wrought or cast iron, or of steel. If a soft material is used, the upper and lower edges, which are the parts worked upon, should be faced with steel. This bed is rounded at its upper and lower edges, as shown at $a\ a'$, the edge $a$ being more convex than the edge $a'$, and from each side of the bed-piece two arms project at right angles, the arms $b\ b$ at one side being provided with holes through which screws pass to secure the implement to a bench or table. Through the arms $b'\ b$, at the opposite side of the bed-piece, set-screws B pass at right angles and vertically. To each end of the bed-piece there is attached, by a screw, $c$, a bar, C, the upper ends of which extend outward horizontally and form gages for the saw to be set, said gages being capable of being moved farther forward or backward, so as to admit of the teeth of the saw projecting a greater or less distance over the bed-piece, as will be understood by referring to Fig. 2.

The implement is used as follows: The saw to be set is placed with its blade upon the set-screws B B, and its teeth bearing against or touching the gages C C and resting upon the upper edge of the bed-piece, and the operator, by means of a hammer, D, shown in Fig. 3, strikes down every alternate tooth of the saw, so that they will come in contact with and be bent to the form of the bed-piece. The saw is then inverted and the intervening teeth operated upon in the same way, which completes the work.

The degree of set to be given the saw is regulated by adjusting the set-screws B higher or lower and moving the gages C, so that the teeth of the saw may project a greater or less distance over the bed-piece.

The edge $a$, which is more convex than the edge $a'$, is used for setting small saws, while the edge $a$ is used for setting large saws. It will be seen that either edge may be placed uppermost, as the gages C may be turned around or adjusted to either edge and the saw-blade made to rest on either ends of the set-screws.

The hammer D, I design to have constructed with one edge, $d$, thicker than the other edge $d'$, the latter being used for setting small, and the other for setting large, saws.

Having thus described my invention, what I claim as new, and desire to secure by Letters Patent, is—

The combination of the reversible anvil-piece A with its anvil-faces having curvatures of different radii, in combination with an adjustable set gage or gages, C, whose vibration affords an additional means of limiting on either face the set of the teeth, and the screws B or other suitable support for the back of the saw.

JOHN HANFORD, JR.

Witnesses:
E. A. BRUSH,
ALFRED BRUSH.